United States Patent [19]
Kaplit et al.

[11] 4,093,355
[45] June 6, 1978

[54] SYMMETRICAL INTERNAL HEATER FOR LIQUID CRYSTAL DISPLAY

[75] Inventors: Michael Kaplit, Birmingham; Daniel B. Hayden, Port Huron; George W. Smith, Birmingham, all of Mich.

[73] Assignee: General Motors Corporation, Detroit, Mich.

[21] Appl. No.: 765,548

[22] Filed: Feb. 4, 1977

[51] Int. Cl.² .............................................. G02F 1/13
[52] U.S. Cl. .................................. 350/334; 219/209; 219/214
[58] Field of Search ......... 350/160 R, 160 P, 160 LC; 219/209, 214

[56] References Cited
U.S. PATENT DOCUMENTS 3,499,112  3/1970  Heilmeier et al. ............ 350/160 LC
4,029,393  6/1977  Dungan et al. ............... 350/160 LC Primary Examiner—Edward S. Bauer
Attorney, Agent, or Firm—Robert J. Wallace

[57] ABSTRACT

A liquid crystal cell having an internal resistance-type heating means for rapid cell warm-up, and for maintaining the cell at a predetermined temperature while it is operating as a visual display. The heating means comprises electrically symmetrical transparent films of resistance material on facing surfaces of transparent members sandwiching the liquid crystal material. The resistive films are covered with an insulating film, on which is disposed the control electrodes for the electro-optic display of the liquid crystal cell. Heating voltages, higher than those required to operate the visual display, can be safely applied in parallel across the films without interfering with a concurrent visual display.

6 Claims, 4 Drawing Figures

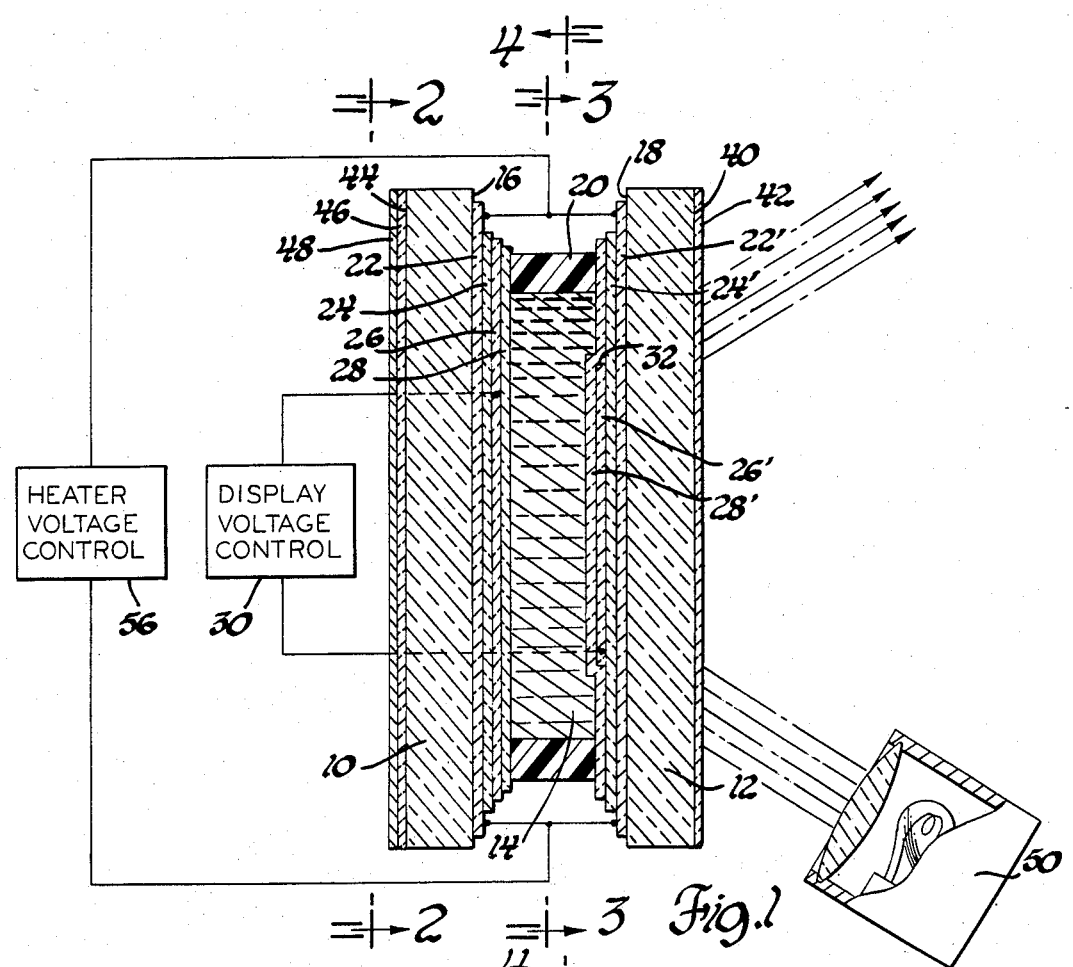
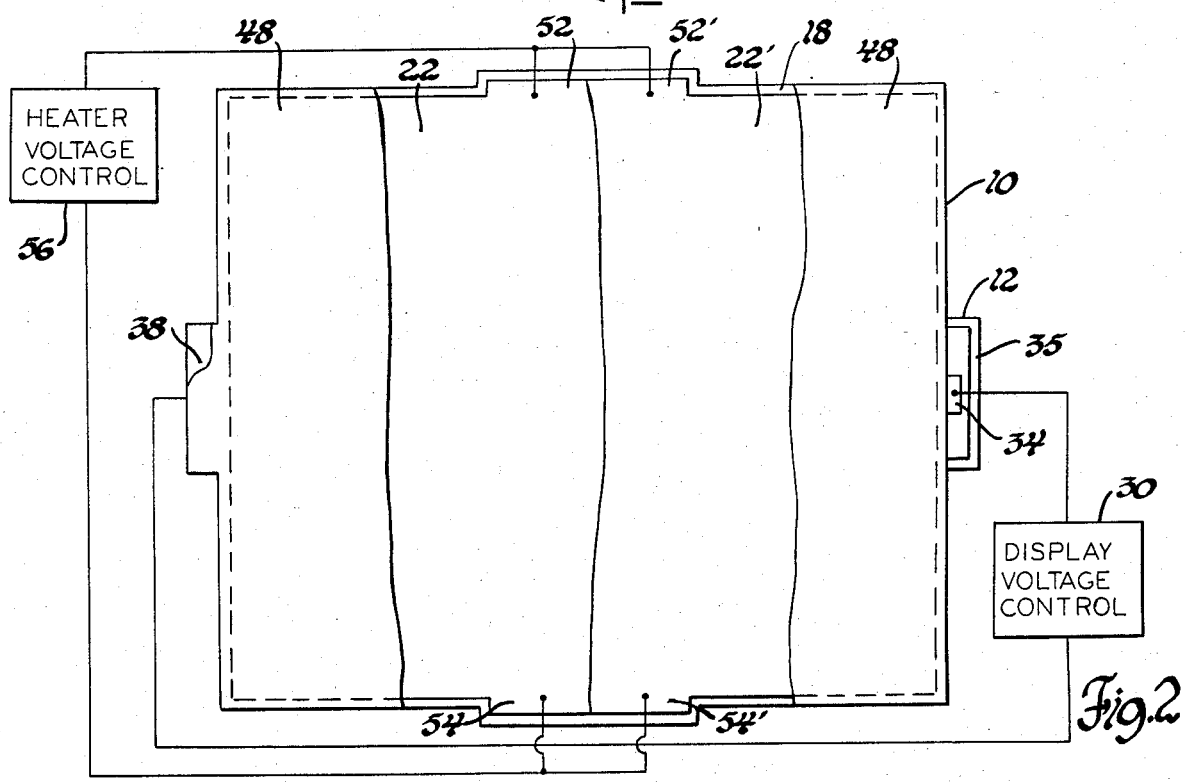

SYMMETRICAL INTERNAL HEATER FOR LIQUID CRYSTAL DISPLAY

BACKGROUND OF THE INVENTION

This invention relates to a liquid crystal display cell, and more particularly to an internal resistance-type heater for a liquid crystal display cell.

It is known that liquid crystal materials exhibit their liquid crystal phase over only a limited temperature range. Below this range these materials are generally solids, and above this range they are ordinary isotropic liquids. The first known liquid crystal materials usually had a liquid crystal phase only within a very limited range above room temperature. Through continued development, many liquid crystal materials are now available that have a liquid crystal phase over considerably wider ranges.

A large variety of materials are now available that exhibit a liquid crystal phase from room temperature to well over 100° C. Therefore, moderately elevated ambient temperatures normally do not present a problem with respect to their use in electro-optic displays. On the other hand, there are only a few materials which exhibit liquid crystal characteristics significantly below room temperature. Of those that do, their viscosities are generally so high at such low temperatures that the response time of an electro-optic display using them is undesirably long. Accordingly, liquid crystal displays have heretofore been limited chiefly to moderate ambient temperature applications, as for example, calculator displays, wristwatch displays, etc.

If a liquid crystal display cell is to be subjected to ambient temperatures colder than room temperature, the cell may have to be heated to be satisfactorily operative. This is particularly true for display cells subjected to the winter temperature extremes of temperate and polar climates. In such climates, exterior visual displays, automobile instrument panel displays, and the like, would require heating means for maintaining the liquid crystal material in its liquid crystal phase and at an appropriate viscosity. For commercial practicality, the heating means must fulfill a number of ancillary requirements to be satisfactory. For example, in automotive applications, it must be more than just effective to protect against moderately low weather temperatures. In such applications, it must be capable of supplying enough heat for temperatures as low as −40° C. Automotive applications require the heating means to be rapidly effective in warming up the liquid crystal cell to its desired operating temperature, even from −40° C. However, it must also be low in manufacturing cost and efficient in operation. Moreover, it should be simple, rugged and reliable, requiring virtually no maintenance in use. It should also be mentioned, of course, that the heating means should not significantly limit the visual display function of the liquid crystal cell. Thus, separate heated enclosures for the liquid crystal cell are generally not desirable.

One technique for providing a reflectance mode electro-optic liquid crystal display device is disclosed in the copending U.S. patent application Ser. No. 681,472, which is entitled "Integrated Thermally Compensated Liquid Crystal Display Device" and which was filed in the names of Dennis F. Dungan and Adolph L. Micheli on Apr. 29, 1976, now U.S. Pat. No. 4,029,393. U.S. Ser. No. 681,472 describes an integrated self-regulating heating element for a liquid crystal cell. The liquid crystal material is sandwiched between a transparent front plane member and a barium titanate back plane member. The barium titanate member forms an integral part of the cell and serves as a source of heat for the cell. Barium titanate has a positive coefficient of electrical resistance that can be tailored for a given application. Electrical current can be passed through the barium titanate member under a constant voltage to provide a self-regulating cell heat source. No separate thermostatic or other type of control is required. Since the voltage applied to the display control electrodes can be a fixed voltage, the voltage source for the display control electrodes can also be used for the barium titanate member too. Thus, it can share the same power supply and even share electrical connections with the electro-optic display electrodes of the cell. This latter invention provides a unique way of heating reflectance mode electro-optic displays.

An integrated resistance-type heater in the liquid crystal cell, such as described in the aforementioned U.S. Ser. No. 681,472 is an attractive and effective heating means. However, we have now discovered a new form of heater integration in a liquid crystal cell, which provides new advantages not available in the prior integrated heater construction. In the new construction, the liquid crystal cell can be used in both the transmissive mode and in the reflectance mode. The heating means in the new integrated means is more intimately associated with the liquid crystal material for more rapid cell warm-up and lower power consumption. It is integrated within the cell itself between facing transparent members enclosing the liquid crystal material of the cell. Moreover, in the new integrated heater structure, two heater elements are included, not just one, for even quicker and more efficient cell warm-up.

The heating elements in our new integrated structure are coatings of resistance material uniquely incorporated in the cell. They are not components that need be specially prepared in advance of cell fabrication, as the barium titanate heating element in the aforementioned U.S. Ser. No. 681,472. Our heating elements are formed during cell fabrication, by techniques similar to those already used in making liquid crystal cells. This contributes to a net cost saving in cell construction.

Proximity to the liquid crystal material for heating purposes can produce electrical fields deleterious to the electro-optic display. However, due to a unique electrical symmetry in our heating elements, such fields are suppressed. Heating voltages in excess of cell threshold voltage can be used without producing fringing electrical fields in the liquid crystal material. Thus, the cell can be strongly heated even while it is concurrently electro-optically displaying an intended message.

OBJECTS AND SUMMARY OF THE INVENTION

It is, therefore, a principal object of this invention to provide an improved integrated resistance-type heater in an electro-optic liquid crystal display cell.

A further object of this invention is to provide a unique dual internal resistance-type electrical heater in a liquid crystal display cell for strongly heating the cell even while it is simultaneously electro-optically displaying an intended message.

In our improved liquid crystal cell construction, transparent coatings of resistance material are included on the facing surface portions of the electro-optic display members forming the cell. The coatings are mutually electrically symmetrical. In a preferred embodiment, they are electrically symmetrical because they have the same composition, the same thickness, the same configuration and the same size. Moreover, they are registered with one another, have symmetrical electrical contact areas, and the symmetrical contact areas are electrically in parallel. The coatings of resistance material are overcoated with a dielectric material and electro-optic display control electrodes formed on the dielectric material. Light polarizing and reflective coatings are included as required for the operative mode of the cell.

BRIEF DESCRIPTION OF THE DRAWING

Other objects, features and advantages of this invention will become more apparent from the following description of the preferred embodiment thereof and from the drawing, in which:

FIG. 1 shows a schematic cross-sectional view of a liquid crystal cell made in accordance with the invention;

FIG. 2 shows an elevational view, with parts broken away, along the line 2—2 of FIG. 1;

DESCRIPTION OF THE PREFERRED EMBODIMENT

Figure 3:
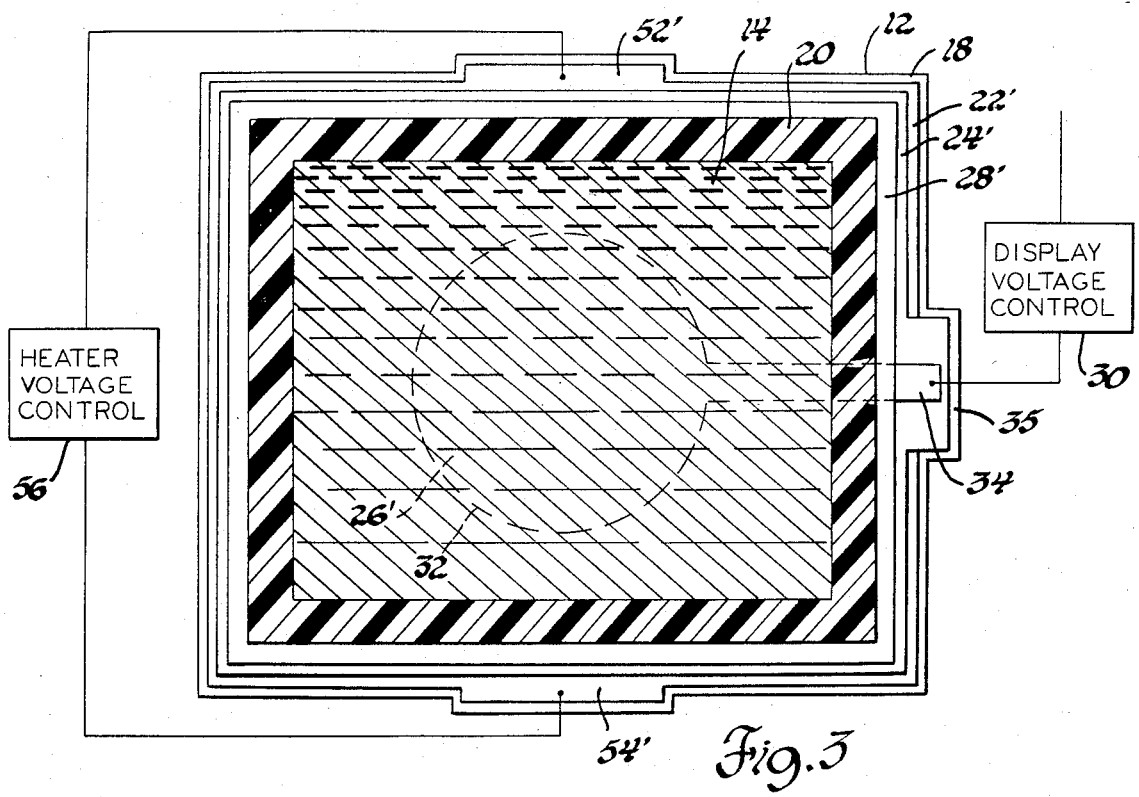
FIG. 3 shows a sectional view along the line 3—3 of FIG. 1.

The drawings show an embodiment of the invention as used in a twisted nematic liquid crystal electro-optic cell. The cell has two flat transparent plate-like members 10 and 12, between which a nematic liquid crystal material 14 is sandwiched. Transparent members 10 and 12 are of glass, quartz or the like. Our invention can be used in any type of electro-optic liquid crystal cell with any nematic, smectic or chloesteric type of liquid crystal material. For example, the twisted nematic cell shown in the drawings can use the nematic liquid crystal material 4-cyano-4'-N-pentyl biphenyl. In a dynamic scattering cell, the liquid crystal material could be N-(p-methoxy benzylidene)-p-n-butyl aniline. The liquid crystal is retained between facing surfaces 16 and 18 of transparent members 10 and 12, respectively, by means of a peripheral seal 20 of solder glass, epoxy or the like. Seal member 20 cooperates with transparent members 10 and 12 to form a closed chamber that is completely filled with the liquid crystal material 14.

Transparent members 10 and 12 are each about 0.16 cm thick. Facing surfaces 16 and 18 are rectangular and of about 2.5 cm by 1.3 cm dimension. However, the size of the transparent members is no more relevant to this invention than to any other liquid crystal cell. Hence, their dimensions can be varied as desired. Conventional liquid crystal thicknesses, about 6 – 50 micrometers, can be used in the display area of our cell. We prefer a thickness of less than about 30 micrometers. The liquid crystal thickness used in this example is about 12 micrometers.

Each of the facing surfaces 16 and 18 has a plurality of complementary coatings thereon that are shown in exaggerated thickness in the drawings for purposes of illustration. The coatings on facing surface 16 of the first transparent plate 10 shall be hereinafter referred to by a designated reference number. The complementary coatings on the facing surface 18 of the second transparent member 12 shall be hereinafter referred to by the same reference number followed by a prime (') designation.

Facing surface 16 of transparent member 10 has a continuous transparent coating 22 of a resistive material thereon. Resistive material coating 22 is covered by a continuous first coating 24 of a dielectric material on which is disposed an electro-optic liquid crystal display control electrode 26. In describing this invention, electrode 26 on transparent member 10 shall be referred to as the back plane electrode. Back plane electrode 26 is, in turn, covered with a second dielectric coating 28 for producing homogeneous alignment of nematic liquid crystals in the cell. If such alignment is not desired, coating 28 is not used.

Analogously, facing surface 18 of the second transparent member 12 has a continuous transparent coating 22' of a resistive material thereon that is electrically symmetrical with resistive material coating 22 on facing surface 16. The expression "electrically symmetrical" shall be hereinafter further discussed. It is the presence of the electrically symmetrical resistance material coatings 22 and 22' that provides the distinctive attributes of this invention. Resistive material coating 22' is covered by a first continuous coating 24' of a dielectric material. An electro-optic display control electrode 26' is disposed on first dielectric coating 24'. The latter control electrode 26' is hereinafter referred to as the front plane control electrode. Front plane control electrode 26' is, in turn, covered by a second dielectric coating 28' which serves the same function as coating 28 on the back plane electrode. Analogously, if homogeneous alignment of the liquid crystal material is not desired, the second dielectric coating 28' is not used. The front plane electrode 26' and its associated dielectric coatings 24' and 28' are also transparent.

Since the control electrodes 26 and 26' carry little or no current, they need not be highly conductive. They can be of indium oxide, tin oxide and mixtures thereof. Any of the electrode compositions normally used in a liquid crystal cell can be used as electrode compositions in this invention. The same electrode thickness range is used in this invention as in other liquid crystal cells, for example about 0.1 – 0.3 micrometers. Dielectric material coatings 24, 24' are of the same composition, e.g. silicon dioxide or silicon nitride. A thickness of about 0.1 – 0.3 micrometers can be used. Dielectric coatings 28 and 28' are obliquely evaporated silicon monoxide, magnesium oxide or the like and are about 0.005 – 0.2 micrometers thick.

In the alternative, other surface treatments can be substituted to produce the homogeneous alignment desired. It should also be mentioned that the coatings on facing surfaces 16 and 18, including resistive material coatings 22 and 22', should have a light transmittency of at least 50% to be satisfactorily transparent.

Back plane electrode 26 and the front plane electrode 26' are connected to opposite poles of a display voltage control 30 such as used in other liquid crystal cells. Thus, it would include a voltage source and a switching means, with the voltage source preferably being of the alternating current type. In this example it controls applying about 12 volts across the control electrodes 26 and 26'. However, the control voltage can be varied as in other liquid crystal cells, so long as the threshold voltage of the liquid crystal used in the cell is exceeded. Some liquid crystals can be oriented with applied voltages of only about 1 volt. Other liquid crystals require up to 5 volts. The voltage at which the orientation has a visible effect on liquid crystal orientation is referred to herein as a turn-on or threshold voltage.

In the example of this invention shown in the drawings, a circular disc appears when a display voltage is applied between control electrodes 26 and 26' from the display voltage control 30. Front plane electrode 26' has a circular periphery 32 with an elongated tab-like extension 34 that extends out to a side projection 35 on the second transparent member 12, where it connects to the display voltage control 30. Back plane control electrode 26 is a continuous coating on first transparent member 10 covering the entire area enclosed by the seal member 20, except for a cutout 37 corresponding to and slightly larger than the tab-like portion 34 on front plane electrode 26'. Back plane control electrode 26 has a small tab-like extension 36 on a side projection 38 of first transparent member 10. Outside the area enclosed by seal 20, extension 36 connects to the display voltage control 30. Both of control electrodes 26 and 26' are entirely coated with the dielectric material coatings 28 and 28', respectively, within the area enclosed by seal member 20. The tab-like extensions 34 and 36 on the control electrodes are left uncoated on their outer ends to facilitate making electrical connections to the display voltage control means 30. The control electrodes 26 and 26' do not have to be as shown. They can be in any configuration. Also, they can be segmented in the manner usual for alpha numeric displays. A single segment front plane electrode is shown in the drawing only for ease of illustration.

The outer surface 40 of the second transparent member 12 has a light polarizing film 42 thereon. The outer surface 44 of the first transparent member 10 has a light polarizing film 46 thereon that is, in turn, covered with a reflective film 48 of evaporated aluminum or the like. It is to be understood that in a transmissive mode, reflective film 48 would not be used. Also as usual, the polarizing films may or may not be crossed, depending on the function of the cell. Upon illumination from an ordinary light source 50, the cell shown will display a circular disc, if display voltage control 30 has applied a voltage between control electrodes 26 and 26'. It can be seen, then, that our liquid crystal cell is of conventional construction except for the internal inclusion of the resistive coatings 22 and 22' and their covering dielectric coatings 24 and 24'. While not preferred, they could even be placed contiguous the liquid crystal instead of between their respective display electrodes and transparent members.

In this invention, resistive material coatings 22 and 22' are supported on the inner faces 16 and 18 of the transparent members. They are therefore in intimate association with the liquid crystal material. Such an association can produce undesirable fringing electrical fields in the liquid crystal material, especially if heating voltages higher than the cell threshold voltage are used. Voltage differences between the resistive material coatings can produce such fringing electrical fields that interferes with, alters or otherwise adversely affects an intended visual display. If such fields are produced, heating must be discontinued or continued at a lower voltage while displays are being made.

Figure 4:
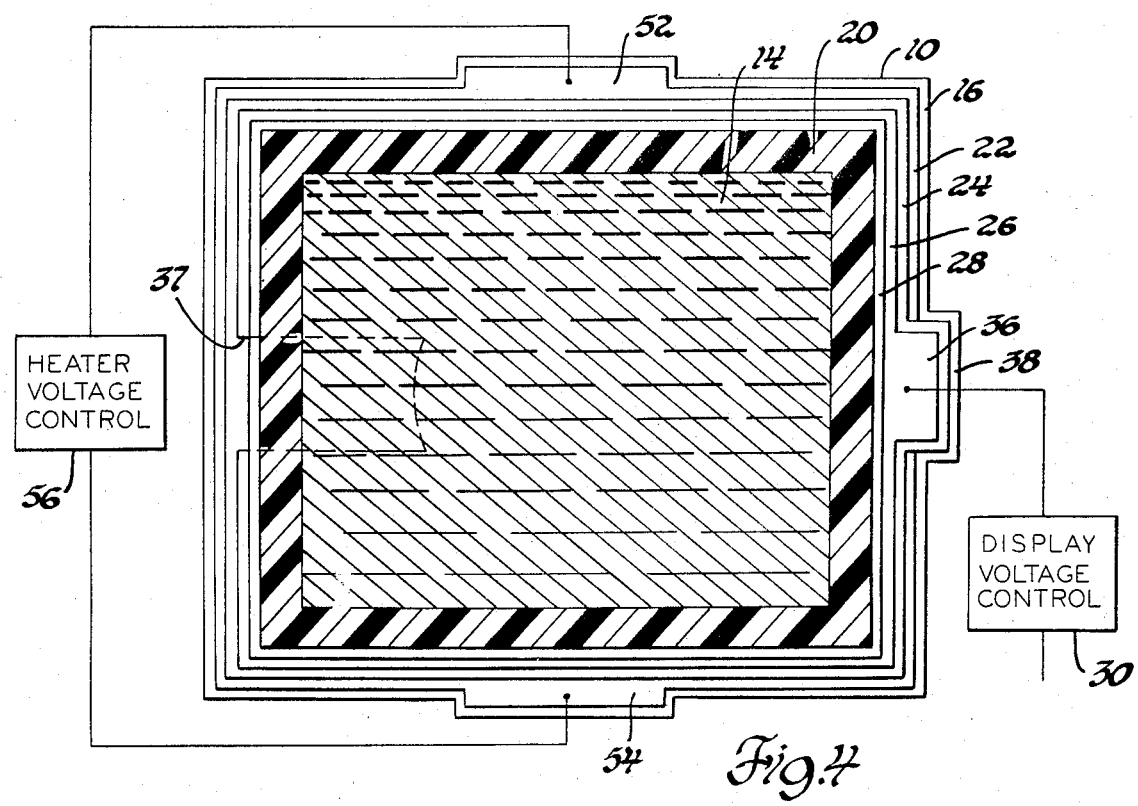
FIG. 4 shows a sectional view along the line 4—4 of FIG. 1.

We have found how to obtain the benefits of internal heating without such adverse effects on the display. In the example of the invention shown in FIGS. 1-4, resistive material coatings 22 and 22' are the same in composition, thickness, configuration, size and method of formation. They are the same in configuration and in register when viewed from the outer surface 40. They are mirror images of one another when the cell is unassembled, and facing surfaces 16 and 18 are viewed side by side. Accordingly, resistive material coatings 22 and 22' are geometrically symmetrical.

Resistive material coating 22 on facing surface 16 is a generally rectangular continuous film completely covering all but the outer edges of the facing surface supporting it. It has an upper tab extension 52 and a lower tab extension 54 for connection to opposite poles of a heater voltage control 56. Heater voltage control 56 includes a power source and thermostatically controlled switching means. The power source has a voltage near or exceeding the threshold voltage of the cell for more rapid heating. Resistive film 22' on facing surface 18 is the same and is registered therewith. It has an upper tab extension 52' and a lower tab extension 54' for connection to opposite poles of the heater voltage control 56. Tab portions 52 and 52' are electrically in parallel and lower tab extensions 54 and 54' are electrically in parallel. Thus, heater voltage control 56 applies the same electrical voltage across each resistive material coating. In that sense the voltage is symmetrically applied. When electrical current is simultaneously passed through the coatings, there will be a voltage drop along each coating. However, this voltage drop is the same for corresponding points along each resistive material coating. There is no resulting significant electrical field component between the coatings to adversely affect a liquid crystal display concurrently being made. The resistive material coatings 22 and 22' are therefore not merely geometrically symmetrical, they are electrically symmetrical.

Because of the electrical symmetry of resistive material coatings 22 and 22', a heating voltage significantly higher than the cell threshold voltage can be applied across their respective contacts 52, 54 and 52', 54'. For automotive applications, for example, the heater voltage control 56 could have a 12 volt power source. Higher voltage power sources could be used too. Heating voltages higher than the cell threshold voltage produce more rapid cell warm-up. Further, resistance material coatings 22 and 22' are within the cell cavity closely adjacent the liquid crystal material. Consequently, they can rapidly transfer their heat to the liquid crystal material for rapid cell warm-up. Since there are two resistance-type heaters, twice the heating effect can be produced, as compared to only one resistance film. Moreover, the heat is applied directly to the display area itself, not to a surrounding area. This also contributes to faster and more efficient heating.

Resistive material coatings 22 and 22' on facing surfaces 16 and 18, respectively, are of indium oxide, tin oxide, mixtures thereof and the like. They are preferably used in thin film form, i.e. less than 5 micrometers. A thickness of about 0.1 - 0.3 micrometers is preferred. We prefer to use the same material for resistive coatings 22 and 22' as are used for display control electrodes in a conventional liquid crystal cell. However, transparent coatings of other materials can be used too. Coatings of any material that will exhibit resistive heating is considered to be a resistive material for purposes of this invention. Hence, a wide variety of compositions can be used as the resistive material for this invention.

It should also be understood that electrical symmetry in resistive material coatings 22 and 22' is most easily obtained by making then symmetrical in composition, shape, size, etc. However, such uniformity is not absolutely necessary. Resistive films 22 and 22' can be of a different composition, thickness, and shape, so long as electrical symmetry is obtained. Resistive material coatings 22 and 22' have been described as a transparent continuous layer, for most effective heating. However, it should be understood that they need not be continuous, so long as they are electrically symmetrical. If not continuous, the resistive material itself need not necessarily be inherently transparent to result in a transparent coating. For example, resistive material coatings 22 and 22' can be in the form of a plurality of bars interconnected at the top and bottom of the cell. However, such a construction does not provide as large a heating effect as a continuous film, and for this reason is not preferred. On the other hand, if in the form of bars, the coating can be sufficiently open to permit use of low transmitting materials in the resistive coating. Transparency of the coating, not transmittency of the resistive material, is important to this invention. Consequently, the term "transparent" is used in this invention in a broader sense, as to connote any conductor arrangement that defines the requisite electrical symmetry necessary to this invention and through which an observer can perceive the portions of the electro-optic display that is produced. Thus, coatings 22 and 22' can be in the form of a fine wire array of an opaque resistance material, wherein the wires are symmetrical and spaced sufficiently to permit viewing of the electro-optic display. Such an array is considered to be a transparent film within the spirit of this invention, as are other arrangements that will be apparent to those skilled in the art.

We claim:

1. A liquid crystal cell having a resistive-type internal heater for rapid warm-up of the liquid crystal cell and for use while the cell is functioning as an electro-optic visual display, said cell comprising:
   first and second members having spaced apart facing surfaces in a visual display area, at least one of said members being transparent in said display area;
   a liquid crystal between said facing surfaces for exhibiting an electro-optic efffect;
   a transparent coating of resistive material on each of said facing surfaces for heating said liquid crystal material from two heat sources simultaneously, each coating being electrically symmetrical with the other for so heating said liquid crystal material without adversely affecting an electro-optic effect concurrently produced therein;
   a transparent dielectric coating on each of said resistive material coatings; and
   a transparent electrode on each of said dielectric coatings for producing an electro-optic effect in said liquid crystal material.

2. A liquid crystal cell having a resistance-type internal heater for rapid warm-up of the liquid crystal cell and for use while the cell is functioning as an electro-optic visual display, said cell comprising:
   first and second members having spaced apart facing surfaces in a visual display area, at least one of said members being transparent in said display area;
   a liquid crystal material between said facing surfaces for exhibiting an electro-optic effect upon application of a threshold voltage;
   a transparent coating of resistive material on each of said facing surfaces to which a voltage can be respectively applied for heating said liquid crystal material at both of said facing surfaces, each coating being mutually electrically symmetrical with the other so that a heating voltage higher than said threshold voltage can be respectively symmetrically applied to said coatings without producing a significant electrical field component therebetween;
   a transparent dielectric coating on each of said resistive material coatings; and
   a transparent electrode on each of said dielectric coatings for producing an electro-optic effect in said liquid crystal material.

3. A liquid crystal cell having a resistance-type internal heater for rapid warm-up of the liquid crystal cell and for use while the cell is functioning as an electro-optic visual display, said cell comprising:
   first and second members having spaced apart facing surfaces providing a visual display area, at least one of said first members being transparent in said display area;
   a liquid crystal material between said facing surfaces for exhibiting an electro-optic effect upon application of a threshold voltage;
   a transparent continuous coating of resistive material on each of said facing surfaces to which a voltage can be respectively applied for heating said liquid crystal material at both of said facing surfaces, each coating being of substantially the same composition and thickness as the other and having a periphery substantially symmetrical and in register with the other, whereby a symmetrically applied heating voltage greater than said threshold voltage can be applied to said coatings without also inherently producing a significant voltage differential therebetween;
   a transparent dielectric coating on each of said resistive material coatings; and
   a transparent display electrode on each of said dielectric coatings for producing an electro-optic effect in said liquid crystal material.

4. A liquid crystal cell having a resistance-type internal heater for rapid warm-up of the cell and for use while the cell is functioning as an electro-optic visual display, said cell comprising:
   first and second transparent members having spaced apart facing surfaces providing a visual display area;
   a liquid crystal material between said facing surfaces for exhibiting an electro-optic effect upon application of a threshold voltage;
   a transparent continuous coating of resistive material on each of said facing surfaces to which a voltage can be respectively applied for heating said liquid crystal material at both of said facing surfaces, each coating covering substantially the entire display area and having a periphery substantially coextensive with the other, each coating further having substantially the same composition and thickness as the other and symmetrical electrical contact areas;
   means electrically parallelling said symmetrical contact areas for symmetrically applying a heating voltage to each of said respective material coatings that is substantially greater than said threshold voltage without producing a significant voltage differential at any point therebetween;
   a first transparent dielectric coating on each of said resistive material coatings; and
   a transparent electrode on each dielectric coating for producing an electro-optic effect in said liquid crystal material.

5. In an electro-optic liquid crystal display apparatus having a visual display cell formed of two electro-optic members with a liquid crystal material in a display area therebetween, the improvement which includes:
   transparent coatings of resistance material supported on facing surface portions of said members for heating said liquid crystal material from two opposite faces, the coatings being mutually electrically symmetrical for heating said liquid crystal material from said opposite faces without adversely affecting an electro-optic effect concurrently produced therein; and
   means in parallel with said coatings for applying a heating voltage across each of said coatings in excess of an electro-optic visual display threshold voltage for said cell.

6. In an electro-optic liquid crystal display apparatus having a visual display cell formed of two transparent electro-optic members with liquid crystal material in a display area therebetween, the improvement which includes:
   transparent continuous coatings of a resistive material on facing surface portions of said cell members for heating said liquid crystal material from two opposite faces, said coatings covering substantially the entire display areas of said members and having substantially registered peripheries and contact areas, said coatings further having the same composition and thickness;
   means for electrically parallelling said registered contact areas on said coatings; and
   means for applying a heating current through said electrically parallelled coatings under a voltage in excess of an electro-optic visual display threshold voltage for said cell.

* * * * *